(12) United States Patent
Rantanen et al.

(10) Patent No.: US 8,190,156 B2
(45) Date of Patent: May 29, 2012

(54) METHOD AND APPARATUS FOR SELECTING NETWORK PROVIDERS

(75) Inventors: Tommi Rantanen, Tampere (FI); Jukka Ala-Vannesluoma, Tampere (FI); Mikko Tasa, Tampere (FI)

(73) Assignee: Nokia Corporation, Espoo (FI)

( * ) Notice: Subject to any disclaimer, the term of this patent is extended or adjusted under 35 U.S.C. 154(b) by 1003 days.

(21) Appl. No.: 12/165,078

(22) Filed: Jun. 30, 2008

(65) Prior Publication Data
US 2009/0325575 A1    Dec. 31, 2009

(51) Int. Cl.
*H04W 4/00* (2009.01)
(52) U.S. Cl. ............. 455/435.3; 455/435.1; 455/435.2
(58) Field of Classification Search .......... 455/406, 455/407, 411, 435.1, 435.2, 435.3
See application file for complete search history.

(56) References Cited

U.S. PATENT DOCUMENTS

| | | | |
|---|---|---|---|
| 7,096,014 B2 * | 8/2006 | Haverinen et al. | 455/432.1 |
| 7,542,451 B2 * | 6/2009 | Cooper et al. | 370/335 |
| 7,818,000 B2 * | 10/2010 | Lin et al. | 455/433 |
| 7,826,842 B2 * | 11/2010 | Buckley et al. | 455/435.2 |

OTHER PUBLICATIONS

3GPP2 C.S0016-B, Over the Air Service Provisioning of Mobile Stations in Spread Spectrum Standards, Oct. 2002.*

* cited by examiner

*Primary Examiner* — Dwayne Bost
*Assistant Examiner* — Larry Sternbane
(74) *Attorney, Agent, or Firm* — Ditthavong Mori & Steiner, P.C.

(57) ABSTRACT

An approach is provided for performing network discovery and selection. Information specifying a list of network access providers that may be associated with a home network service provider is received (e.g., the information may be pre-provisioned, or manually configured). The information includes a field that having at least one of the following values: a first value indicating that the network access providers in the list have a higher priority than unlisted network access providers, a second value indicating that the network access providers in the list have equal priority with the unlisted network access providers, or a third value indicating that only the network access providers on the list are to be selected. A network access provider is selected according to the value of the field. This selection process can also be performed for network service providers.

24 Claims, 11 Drawing Sheets

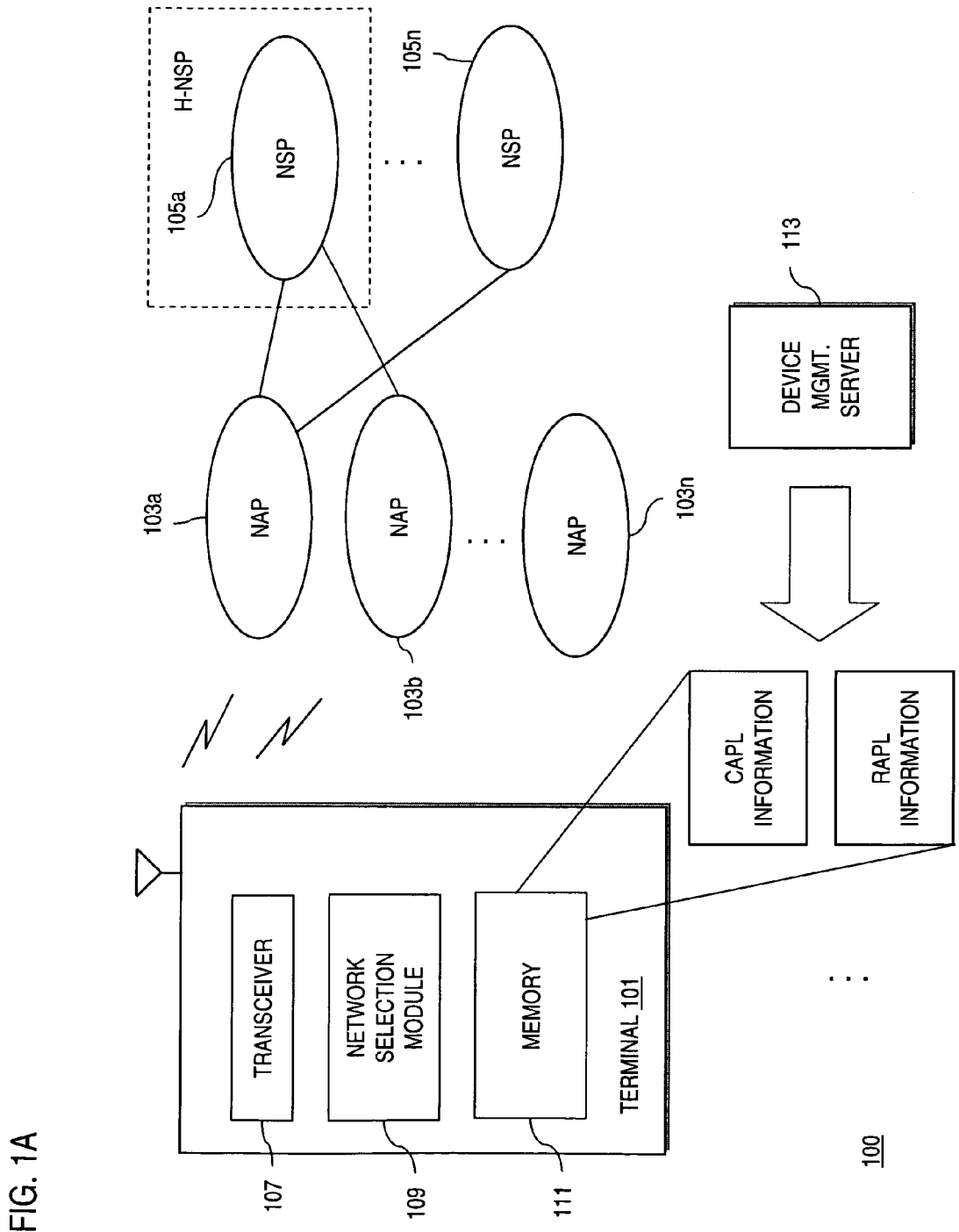

METHOD AND APPARATUS FOR SELECTING NETWORK PROVIDERS

BACKGROUND

Radio communication systems, such as wireless data networks (e.g., WiMAX (Worldwide Interoperability for Microwave Access) systems, DVB (Digital Video Broadcasting)-H (Handheld) systems, and spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. Given the fact that a terminal can communicate with a variety of networks associated with different network service providers, the tasks of managing authorized access and enforcing agreements among these providers are daunting. Present discovery procedures are inadequate to accommodate flexibility and efficiency in the network selection process.

SOME EXEMPLARY EMBODIMENTS

There is therefore a need for an approach for providing network selection.

According to one embodiment, a method comprises retrieving information specifying a list of network access providers which may be associated with a home network service provider, wherein the information includes a field having at least one of the following values: a first value indicating that the network access providers in the list have a higher priority than unlisted network access providers, a second value indicating that the network access providers in the list have equal priority with the unlisted network access providers, or a third value indicating that only the network access providers on the list are to be selected. The method also comprises selecting a network access provider according to the value of the field.

According to another embodiment, an apparatus comprises a selection module configured to process information specifying a list of network access providers which may be associated with a home network service provider, wherein the information includes a field having at least one of the following values: a first value indicating that the network access providers in the list have a higher priority than unlisted network access providers, a second value indicating that the network access providers in the list have equal priority with the unlisted network access providers, or a third value indicating that only the network access providers on the list are to be selected. The selection module is further configured to select a network access provider according to the value of the field.

According to another embodiment, a method comprises retrieving information specifying a list of network service providers, wherein the information includes a field having at least one of the following values: a first value indicating that the network service providers in the list have a higher priority than unlisted network service providers, a second value indicating that the network service providers in the list have equal priority with the unlisted network service providers, or a third value indicating that only the network service providers on the list are to be selected. The method also comprises selecting a network service provider according to the value of the field.

According to yet an exemplary embodiment, an apparatus comprises a selection module configured to process information specifying a list of network service providers, wherein the information includes a field having at least one of the following values: a first value indicating that the network service providers in the list have a higher priority than unlisted network service providers, a second value indicating that the network service providers in the list have equal priority with the unlisted network service providers, or a third value indicating that only the network service providers on the list are to be selected. The selection module is further configured to select a network service provider according to the value of the field.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The invention is illustrated by way of example, and not by way of limitation, in the figures of the accompanying drawings in which like reference numerals refer to similar elements and in which:

FIGS. 1A and 1B are diagrams of a communication system capable of providing network discovery, according to an exemplary embodiment;

DETAILED DESCRIPTION

An apparatus, method, and software for providing network selection within mobile devices are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to WiMAX (Worldwide Interoperability for Microwave Access) technology, it is recognized by one of ordinary skill in the art that the embodiments of the invention have applicability to any type of communication services and equivalent technologies.

Figure 1B:
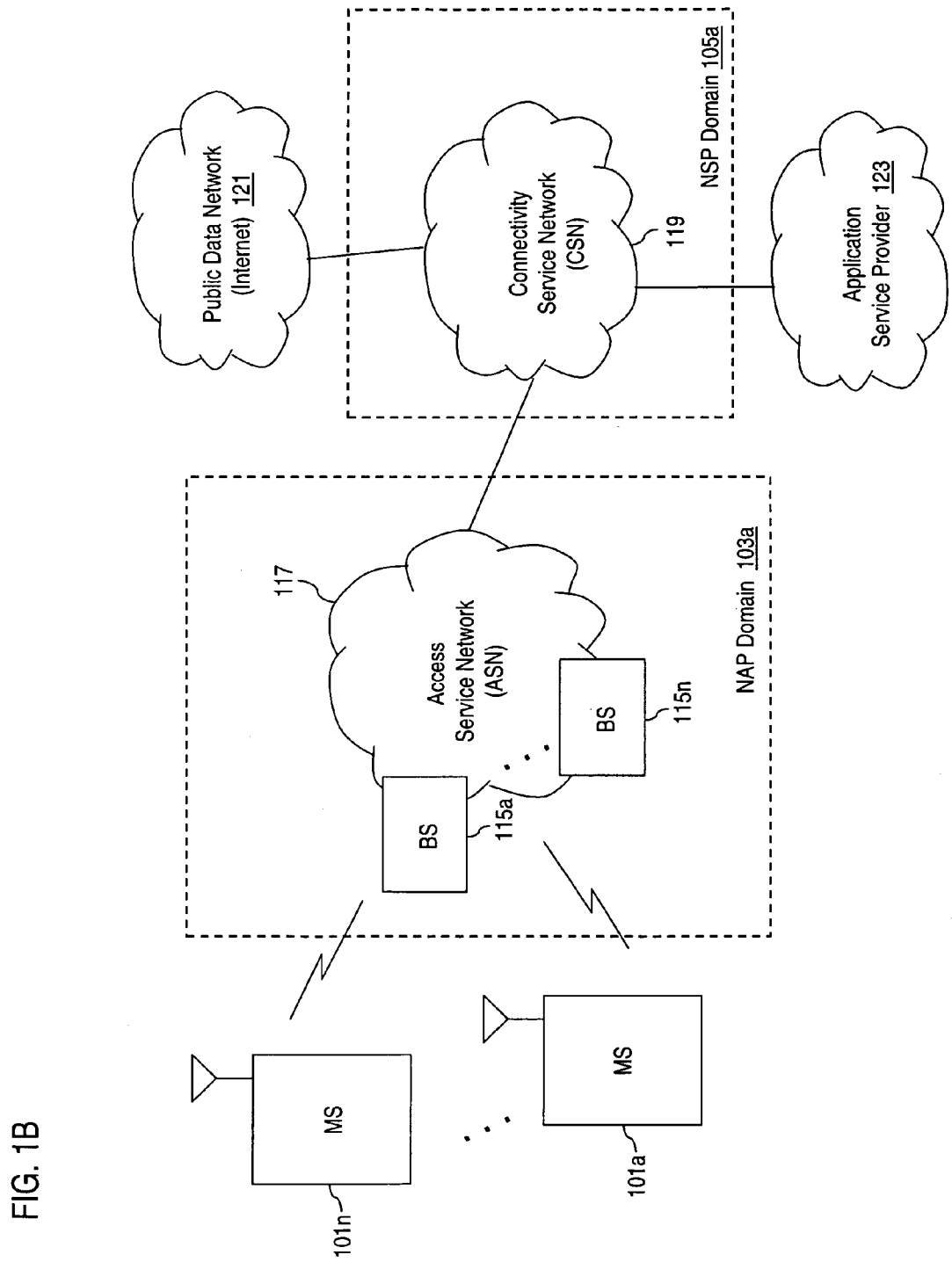

FIGS. 1A and 1B are diagrams of a communication system capable of providing network discovery, according to an exemplary embodiment. A communication system 100, as seen in FIG. 1A, includes one or more terminals (or subscriber stations) 101, which are configured to utilize network access providers 103a-103n for accessing connectivity service networks (CSNs) operated by various network service providers (NSPs) 105a-105n. The subscriber stations 101 may be any type of mobile stations (MS) or user equipment, such as handsets, terminals, stations, units, devices, or any type of interface to the user (such as "wearable" circuitry, etc.). The terminal 101 includes a transceiver 107 and an antenna system that couples to the transceiver 107 to receive or transmit signals to a base station (not shown) of a serving NAP (e.g., NAP 103a). A network selection module 109 performs a search procedure for network connectivity; this procedure relies on a contractual agreement preference list (CAPL) and a roaming agreements preference list (RAPL) to determine which NAPs 103a-103n and NSPs 105a-105n can serve the terminal 101. A memory 111 stores the CAPL information and RAPL information, which, in an exemplary embodiment, is supplied to the terminal 101 by a device management server 113. The CAPL information and RAPL information can also be supplied to the terminal 101 at the point of manufacturing, at the point of sale or at some other point or means (e.g. the information can be pre-provisioned). The CAPL information and RAPL information can also be configured manually. The device management server 113 may reside within the domain of a home network service provider (H-NSP), which, for example, can be NSP 105a.

For the purposes of illustration, the system 100 has a WiMAX (Worldwide Interoperability for Microwave Access) architecture, as shown in FIG. 1B. According to one embodiment, one or more base stations 115a-115n are part of an access service network (ASN) 117, which is further detailed in FIGS. 7A and 7B. The access service network 117 is configured to communicate with the mobile stations 101a-101n. WiMAX access services can include datacast services, such as packet-based television service or other audio or video streaming services. Multicast technology permit Internet Protocol televisions (IPTV) providers to selectively transmit packetized IPTV data wirelessly to targeted groups of subscribers rather than broadcasting (which can unnecessarily consume network resources).

Typically, ASNs 117 are owned by one or more Network Access Providers (NAPs); this is considered the NAP domain (e.g., NAP 103a). As mentioned, Access Service Network (ASN) 117 provides access service to Connectivity Service Networks (CSN) 119. CSNs 119 provide access to a public data network (e.g., Internet) and one or more application service provider (ASP) networks 123. CSNs a119 are typically owned and operated by network service providers (NSPs) 105a-105n. It is noted that ASN of a NAP can be connected to one or more CSNs of different NSPs. Also, CSN of a NSP can be connected to one or more ASNs of different NAPs. Moreover, NAP and NSP may be the same entity (e.g., company, organization, etc.).

In general, a WiMAX subscriber (e.g., MS 101a) has a business relationship only with a NSP (e.g., NSP 105a). Consequently, when the terminal 101a enters the network, the terminal 101 attempts to search for base stations of such NAPs 103a-103n that are connected to its home-NSP. The terminal 101 may also have been provisioned with data indicating relative NAP preference order for making the connection.

This search procedure is explained below with respect to FIG. 2.

Figure 2:
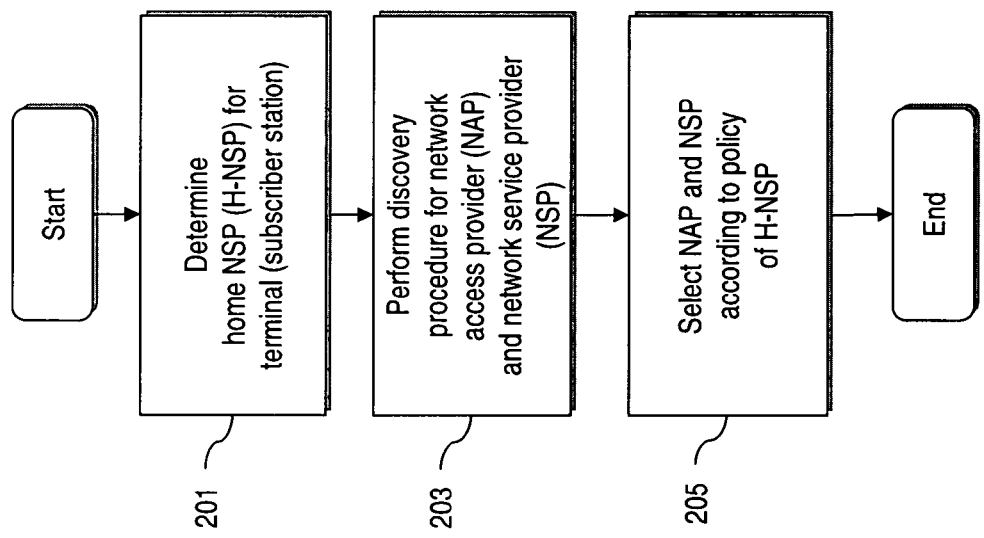
FIG. 2 is a flowchart of a network discovery process, according to an exemplary embodiment.

FIG. 2 is a flowchart of a network discovery process, according to an exemplary embodiment. In step 201, the terminal 101 is aware of its home network service provider (H-NSP). The NSP operators have various types of service agreements with different NAPs 103a-103n (e.g., using some NAPs may cost more than using other NAPs). Consequently, the NSP operators have to control which NAPs 103a-103n are accessible by the terminal 101 for use. The terminal 101, thus, performs a network discovery procedure for the appropriate NAP, as in step 203. Typically, multiple NAPs can be available to the terminal for connecting to the H-NSP or another NSP. In step 205, the terminal 101 selects NAP and NSP according to, for instance, a policy or rule mandated by the H-NSP (i.e., operator).

To facilitate the above search procedure, under WiMAX, a contractual agreement preference list (CAPL) and a roaming agreements preference list (RAPL) are employed, as next described.

Figure 3A:
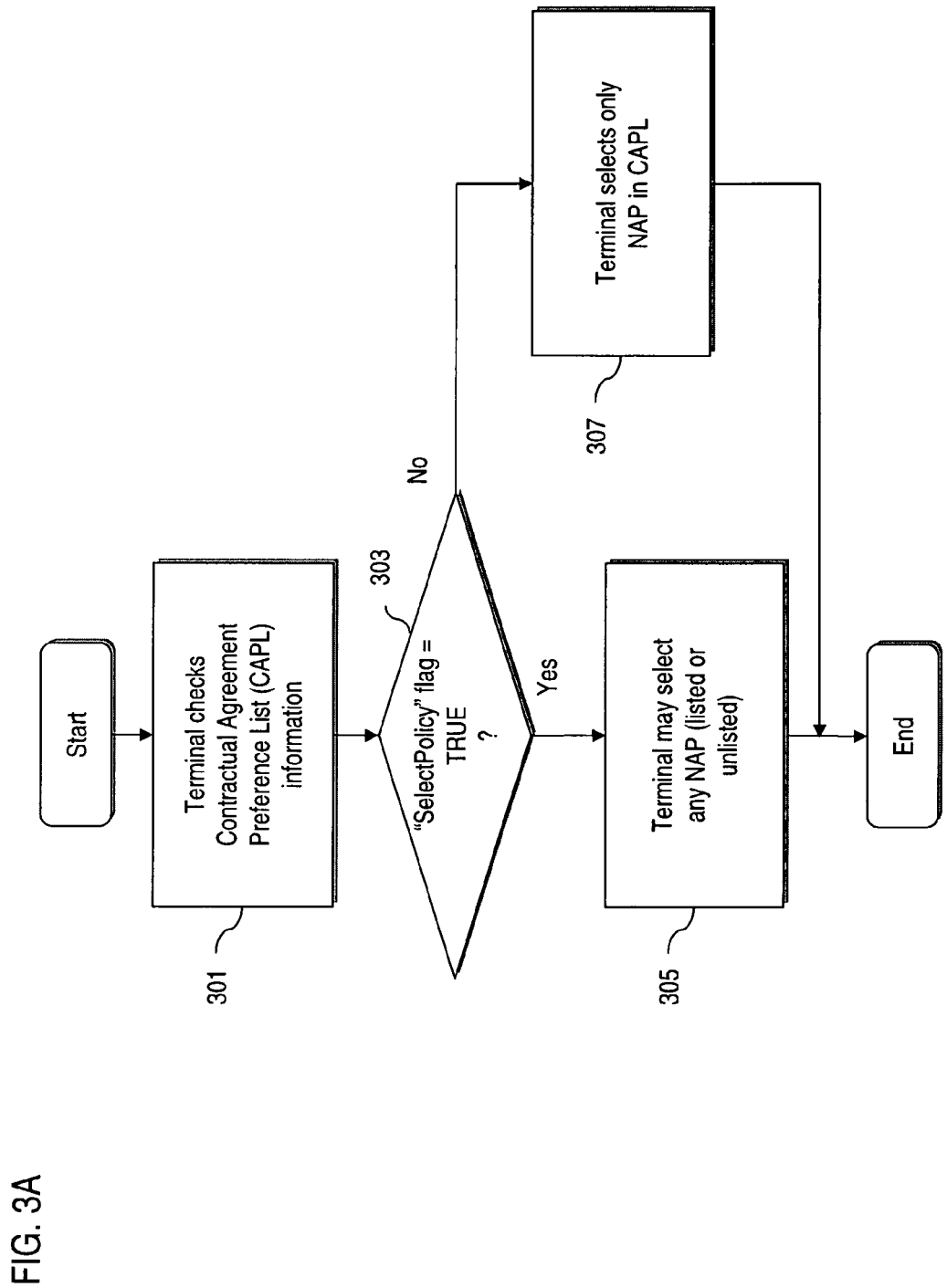
FIGS. 3A and 3B are flowcharts of exemplary processes for selecting networks from a contractual agreement preference list (CAPL) and a roaming agreements preference list (RAPL), respectively.
Figure 3B:
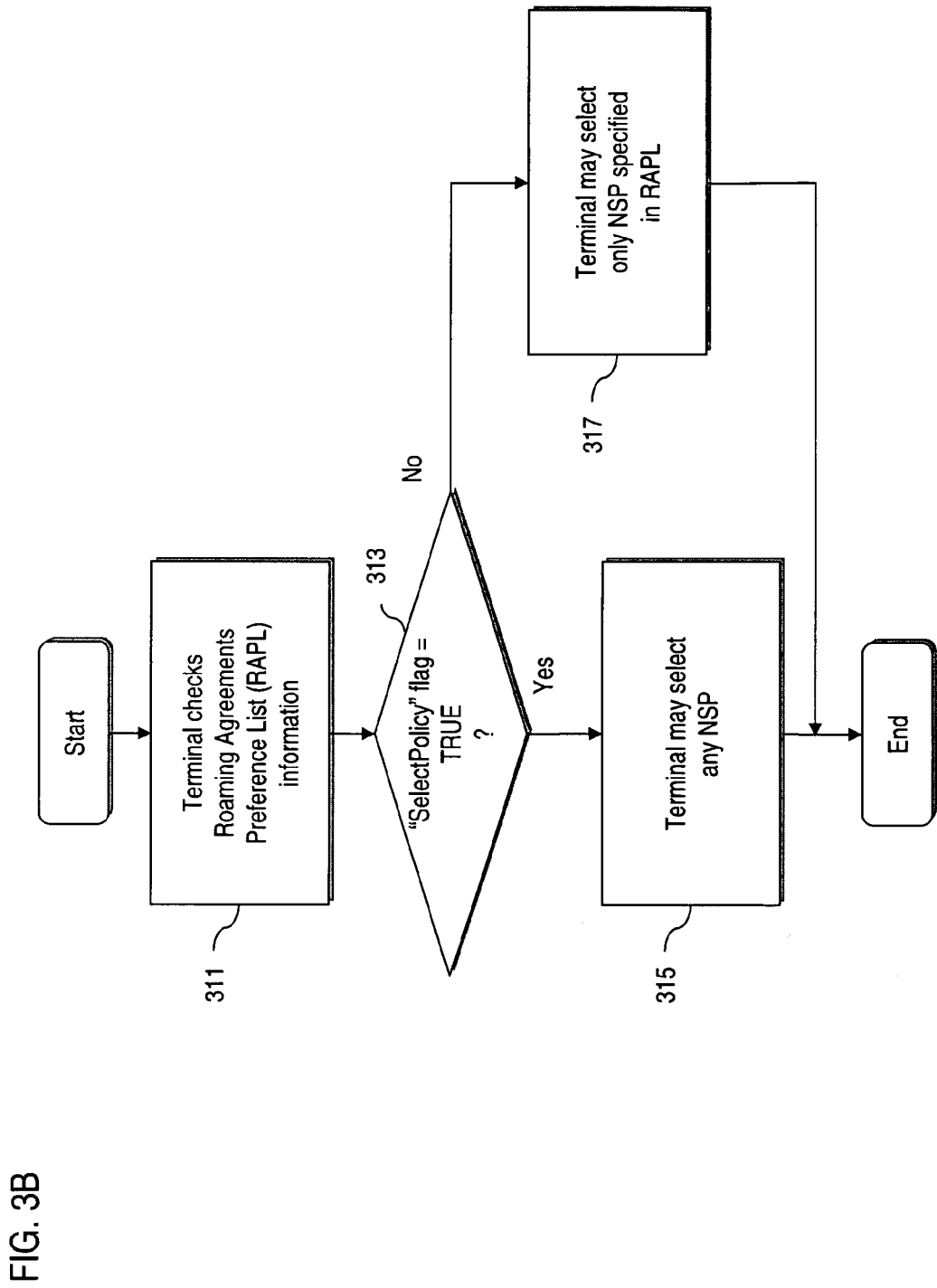

FIGS. 3A and 3B are flowcharts of exemplary processes for selecting networks from a contractual agreement preference list (CAPL) and a roaming agreements preference list (RAPL), respectively. Under this scenario, the NSPs 105a-105n provision the devices of their subscribers with CAPL information, which specifies a list of NAPs that have direct connection to the subscriber's H-NSP 105a. Additionally or alternatively, CAPL may contain information about other NAPs that have not direct connection to the subscriber's H-NSP. CAPL may also set priorities for selection of the NAPs 103a-103n, so that if the terminal 101 finds more than one NAP listed in CAPL during a scan, priority information dictates which one the terminal 101 should use. In step 301, the terminal 101 examines the CAPL information stored in memory 111.

In the WiMAX DM object, there is a "SelectPolicy" flag (also referred to as "Any" flag) defined for both CAPL and RAPL nodes. Accordingly, the CAPL information includes a "SelectPolicy" flag, which value may be "TRUE" or "FALSE". This flag is check in step 303. TRUE indicates that the terminal 101 is allowed to use any NAP that has direct connection to the H-NSP; in the example of FIG. 1, the NAPs with direct connection to H-NSP 105a are NAP 103a and 103b. Accordingly, in step 305, the terminal 101 may select either a listed NAP or an unlisted NAP. However, FALSE indicates that the terminal 101 is not allowed to select any NAP (for connecting to the H-NSP) that is not listed in CAPL; thus, the terminal 101 can only select a NAP that is listed (step 307).

Moreover, the NSPs provision information for roaming agreements with other NSPs. Such information is specified using a roaming agreements preference list (RAPL). In other words, RAPL information lists NSPs 105a-105n that have roaming agreements with the subscriber's H-NSP. Similar to the CAPL, RAPL may also set priorities for the NSPs dictating which should be selected over the other in case several of the listed NSPs are found. To determine the proper NSP, the terminal 101 examines the RAPL information, and an associated "SelectPolicy" flag, per steps 311 and 313.

The "SelectPolicy" flag may be "TRUE" or "FALSE". If the flag is TRUE, the terminal 101 may utilize any NSP that has roaming agreement with the subscriber's H-NSP. In step 315, the terminal 101 selects an NSP from either the RAPL or others that are unlisted. A FALSE value does not permit the terminal 101 to select any NSP outside of the RAPL for making a connection to the network. In step 317, the terminal selects an NSP from the RAPL.

It is recognized that from the processes of FIGS. 3A and 3B, the CAPL and RAPL information are inadequate. Specifically, in the case of CAPL, the "SelectPolicy" flag indicates whether the terminal is allowed to connect to other NAPs that have direct connection to the H-NSP or the ones listed under CAPL node. In the RAPL case, the flag indicates whether the terminal 101 is allowed to connect to other NSPs that have roaming agreement with H-NSP or the ones listed under RAPL node. The problem with the CAPL case is that if the "SelectPolicy" flag is TRUE, the terminal 101 still does not know whether it should prefer NAPs listed under CAPL over the ones that are not listed (but have direct connection to the H-NSP). Likewise, in the RAPL case, if the "SelectPolicy" flag is TRUE, it is problematic that the terminal 101 still does not know whether it should prefer NSPs listed under RAPL over ones that are not listed (but have roaming agreement with the H-NSP).

Figure 4:
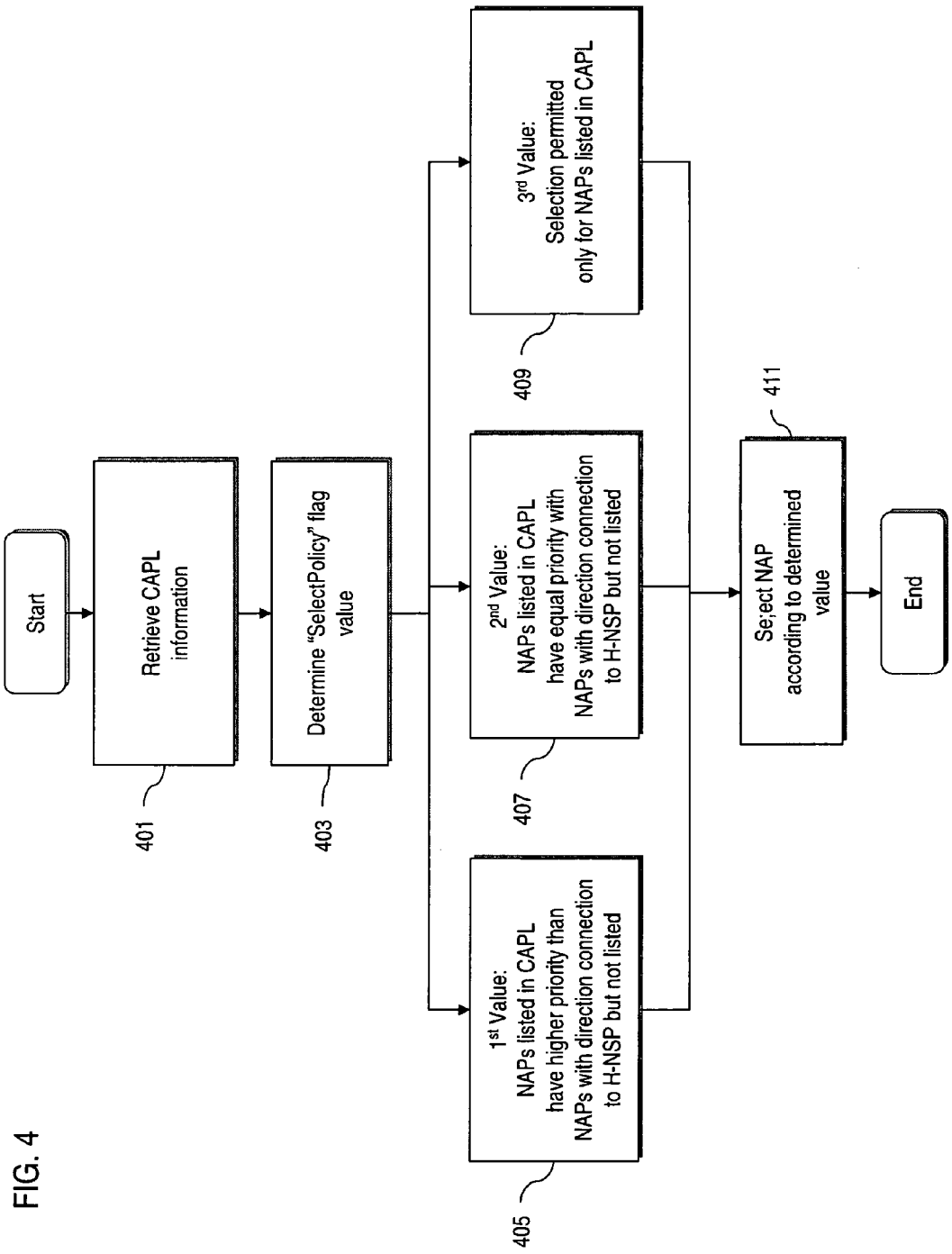
FIG. 4 is a flowchart of a process for using contractual agreement preference list (CAPL) information, according to an exemplary embodiment.
Figure 5:
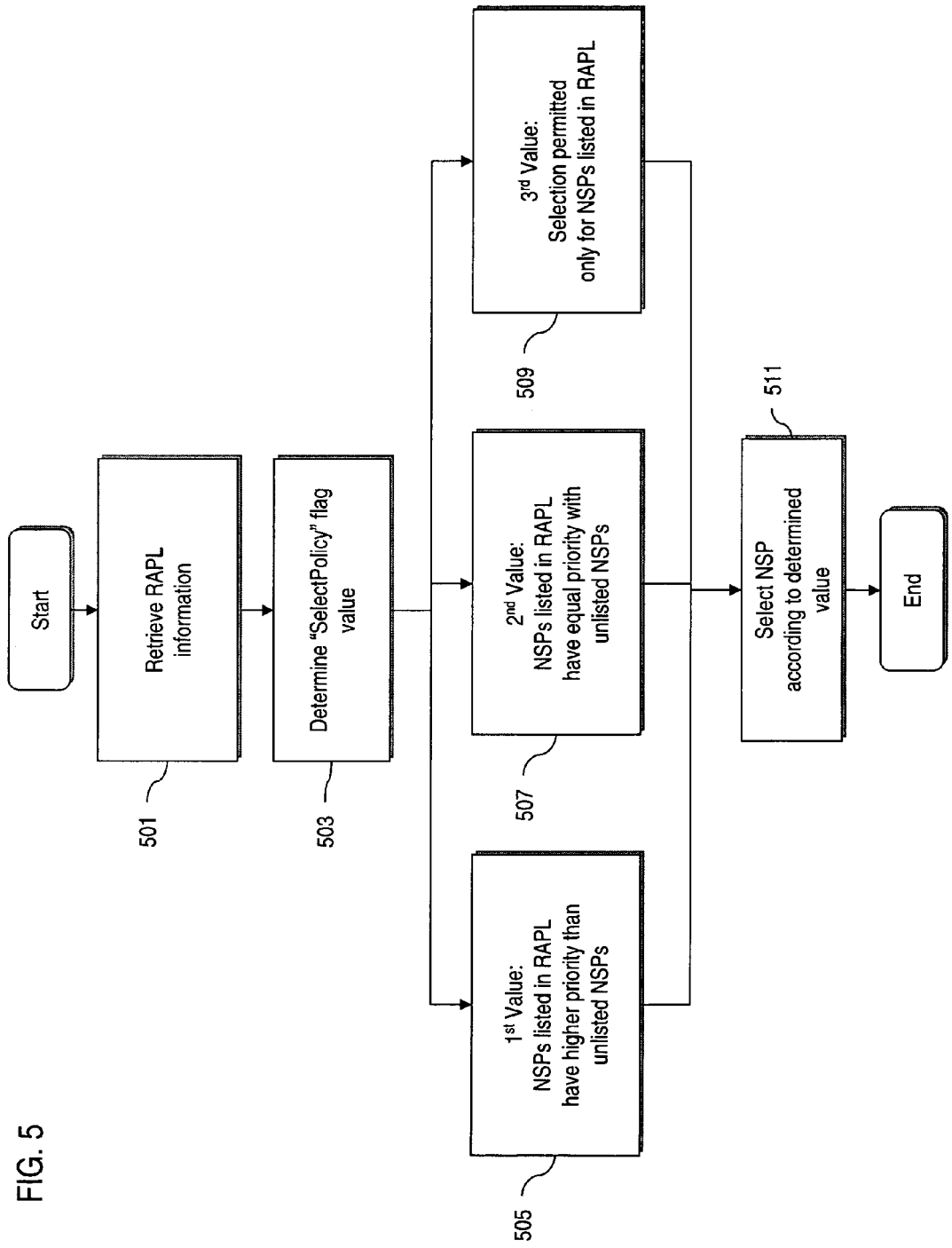
FIG. 5 is a flowchart of a process for using roaming agreements preference list (RAPL) information, according to an exemplary embodiment.

In view of the above concerns, an approach, according to certain embodiments, redefines the CAPL information and RAPL information, as detailed in FIGS. 4 and 5.

FIG. 4 is a flowchart of a process for using contractual agreement preference list (CAPL) information, according to an exemplary embodiment. This process modifies the CAPL to redefine the "SelectPolicy" flag to provide additional information to aid the terminal 101 in the NAP selection process. In step 401, the terminal 101 can retrieve the CAPL information from local memory 111 (having previously obtained the information from the device management server 113); alternatively, the information can be requested dynamically from the device management server 113 or the information can be pre-provisioned to the device 101 by other means or the information can be manually configured to the device 101. The modified "SelectPolicy" flag is examined, per step 403. In an exemplary embodiment, three values are defined for this flag (corresponding to the three mutually exclusive steps 405, 407, and 409). The first value (step 405) indicates that the NAPs listed in CAPL is designated as having higher priority than the unlisted ones (NAPs with direct or indirect connection to H-NSP). The second value (step 407) indicates that the NAPs listed in CAPL have equal priority compared to the ones found (but not listed)—i.e., the terminal 101 can select any found NAP that has direct or indirect connection to the H-NSP. If the $3^{rd}$ value is set, this value indicates that the terminal 101 is not allowed to select any other NAP for making connection to H-NSP other than the ones listed in CAPL. In step 411, the terminal 101 selects the appropriate NAP according to the determined value.

FIG. 5 is a flowchart of a process for using roaming agreements preference list (RAPL) information, according to an exemplary embodiment. In this case, the RAPL information is obtained and the "SelectPolicy" field value is determined, as in steps 501 and 503. If the first value exists (step 505), this indicates that NSPs listed in RAPL have a higher priority than the ones found but not listed. In step 507, the $2^{nd}$ value is determined, indicating that NSPs listed in RAPL have equal priority compared to the unlisted NSPs. In this manner, the terminal 101 can select any found (i.e., discovered) NSP that has roaming agreement with the H-NSP. Lastly, the $3^{rd}$ value (step 509), this value indicates that the terminal 101 can only select the NSPs in the RAPL. In step 511, the terminal 101 makes its selection of NSP according to the determined value.

It is contemplated that the "SelectPolicy" flags, associated the CAPL and RAPL, are reused and redefined. Accordingly, a different, suitable label for the field can be utilized. Further, the exact values for such field can vary depending on the application.

One of ordinary skill in the art would recognize that the processes for performing network selection may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 6:
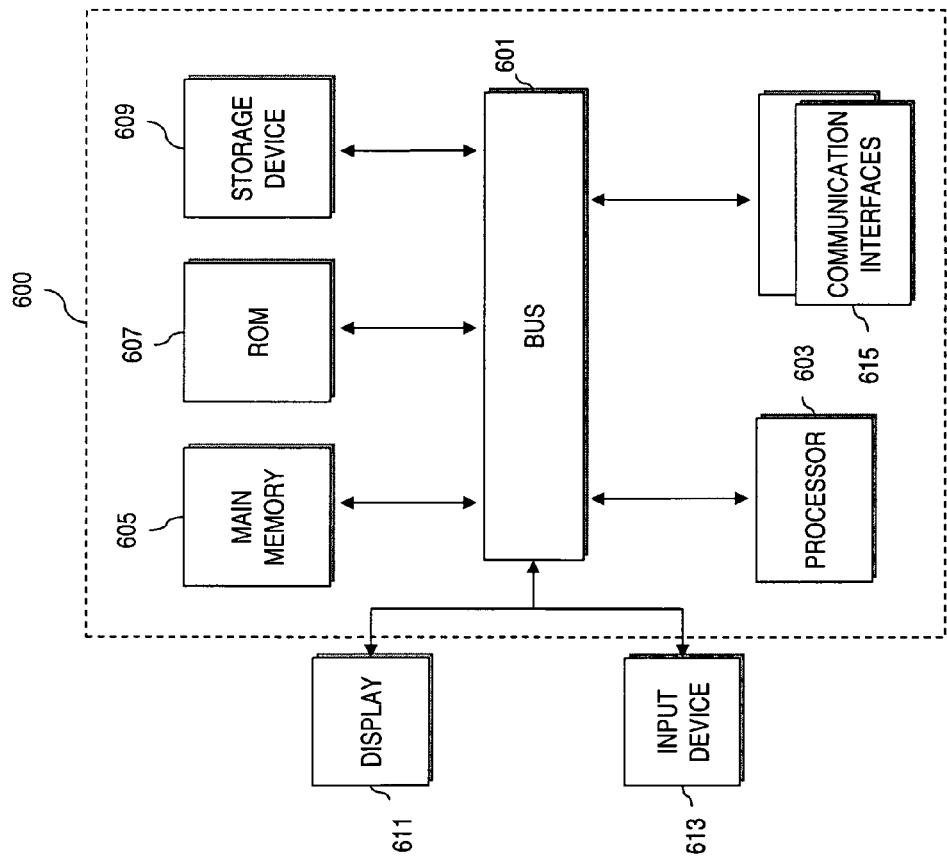
FIG. 6 is a diagram of hardware that can be used to implement an embodiment of the invention.

FIG. 6 illustrates exemplary hardware upon which various embodiments of the invention can be implemented. A computing system 600 includes a bus 601 or other communication mechanism for communicating information and a processor 603 coupled to the bus 601 for processing information. The computing system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computing system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computing system 600 may be coupled via the bus 601 to a display 611, such as a liquid crystal display, or active matrix display, for displaying information to a user. An input device 613, such as a keyboard including alphanumeric and other keys, may be coupled to the bus 601 for communicating information and command selections to the processor 603. The input device 613 can include a cursor control, such as a mouse, a trackball, or cursor direction keys, for communicating direction information and command selections to the processor 603 and for controlling cursor movement on the display 611.

According to various embodiments of the invention, the processes described herein can be provided by the computing system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 600 also includes at least one communication interface 615 coupled to bus 601. The communication interface 615 provides a two-way data communication coupling to a network link (not shown). The communication interface 615 sends and receives electrical, electromagnetic, or optical signals that carry digital data streams representing various types of information. Further, the communication interface 615 can include peripheral interface devices, such as a Universal Serial Bus (USB) interface, a PCMCIA (Personal Computer Memory Card International Association) interface, etc.

The processor 603 may execute the transmitted code while being received and/or store the code in the storage device 609, or other non-volatile storage for later execution. In this manner, the computing system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7A:
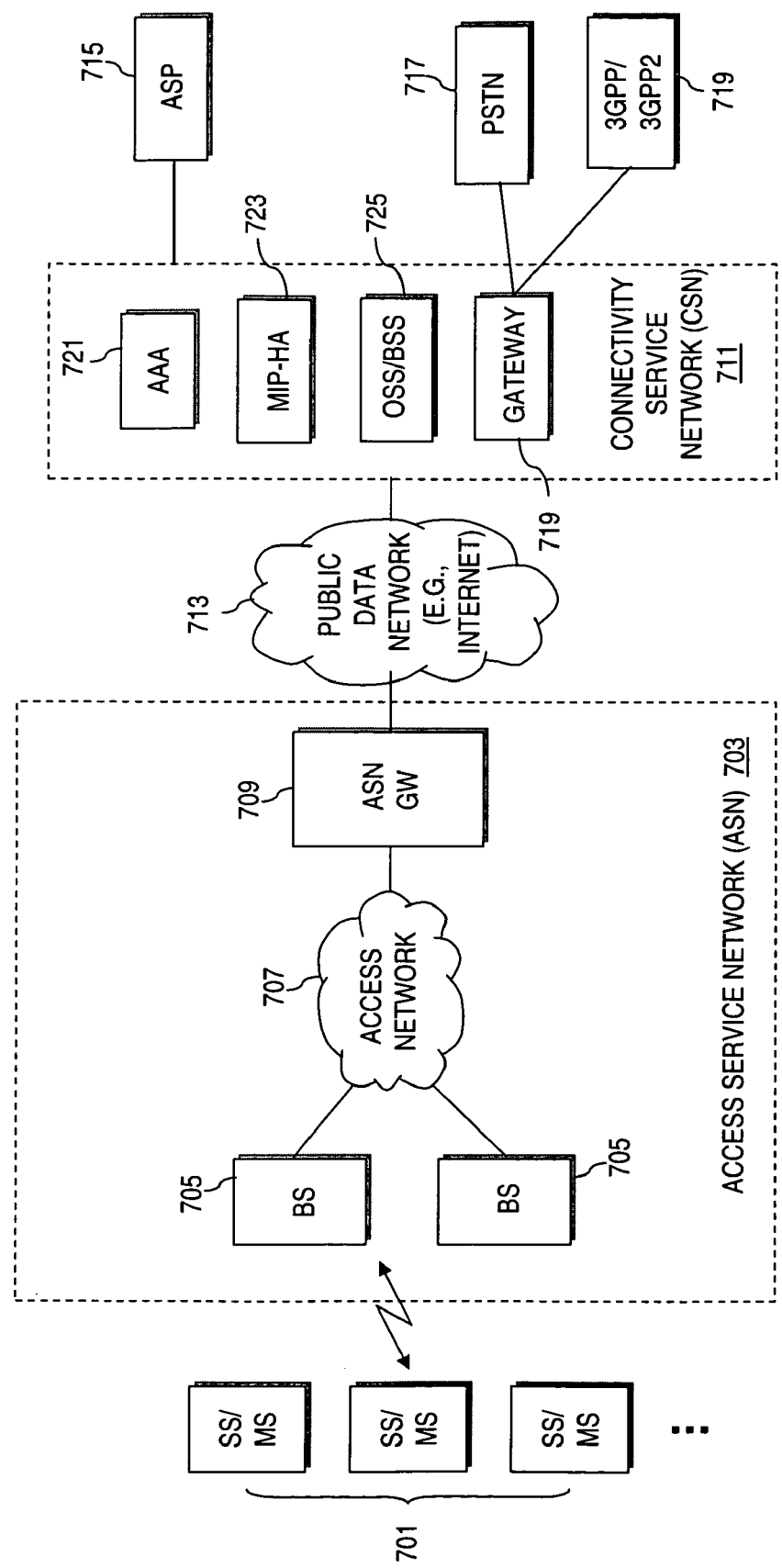
FIGS. 7A and 7B are diagrams of an exemplary WiMAX (Worldwide Interoperability for Microwave Access) architecture, in which the system of FIGS. 1A and 1B can operate, according to various exemplary embodiments of the invention.
Figure 7B:
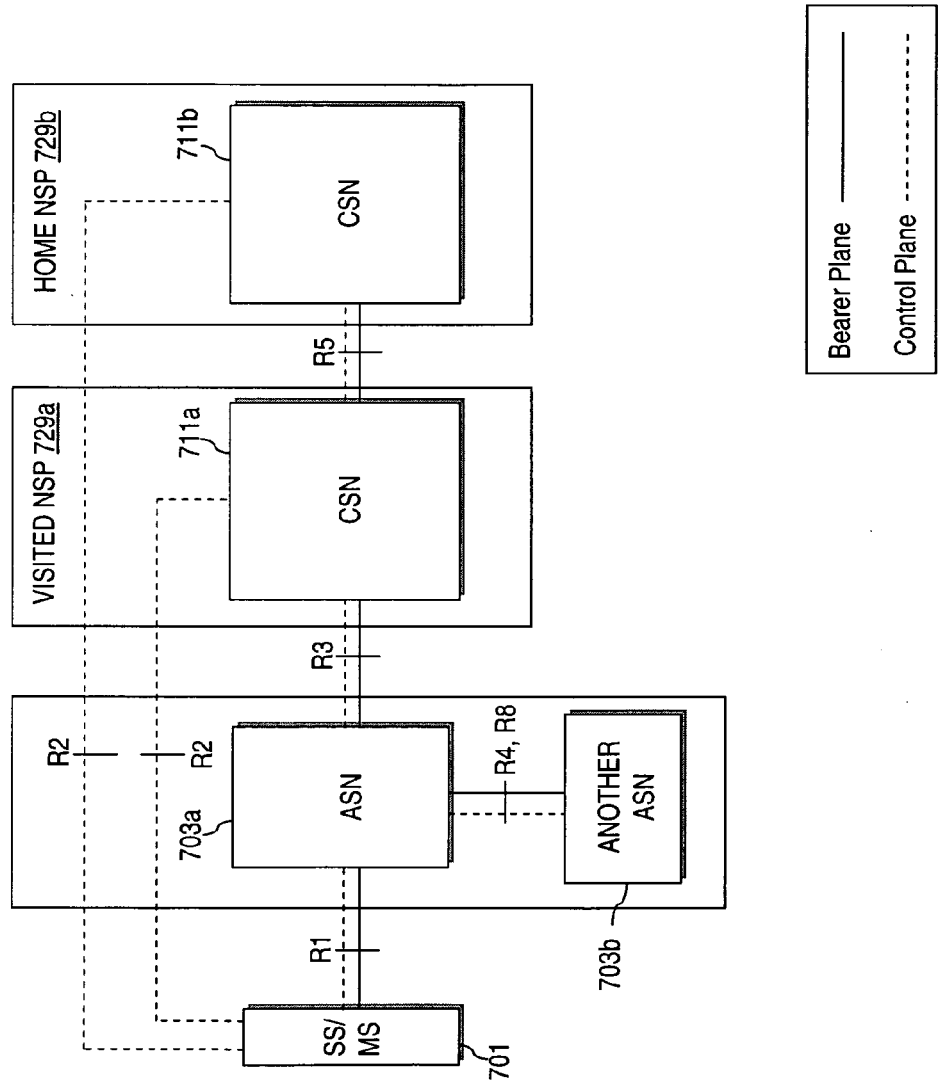

FIGS. 7A and 7B are diagrams of an exemplary WiMAX architecture, in which the system of FIGS. 1A and 1B can operate, according to various exemplary embodiments of the invention. The architecture shown in FIGS. 7A and 7B can support fixed, nomadic, and mobile deployments and be based on an IP service model.

Subscriber or mobile stations 701 can communicate with an access service network (ASN) 703, which includes one or more base stations 705. In this exemplary system, the BS 705, in addition to providing the air interface to the MS 701, possesses such management functions as handoff triggering and tunnel establishment, radio resource management, quality of service (QoS) policy enforcement, traffic classification, DHCP (Dynamic Host Configuration Protocol) proxy, key management, session management, and multicast group management.

The base station 705 has connectivity to an access network 707. The access network 707 utilizes an ASN gateway 709 to access a connectivity service network (CSN) 711 over, for example, a data network 713. By way of example, the network 713 can be a public data network, such as the global Internet.

The ASN gateway 709 provides a Layer 2 traffic aggregation point within the ASN 703. The ASN gateway 709 can additionally provide intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN 711.

The CSN 711 interfaces with various systems, such as application service provider (ASP) 715, a public switched telephone network (PSTN) 717, and a Third Generation Partnership Project (3GPP)/3GPP2 system 719, and enterprise networks (not shown).

The CSN 711 can include the following components: Access, Authorization and Accounting system (AAA) 721, a mobile IP-Home Agent (MIP-HA) 723, an operation support system (OSS)/business support system (BSS) 725, and a gateway 727. The AAA system 721, which can be implemented as one or more servers, provide support authentication for the devices, users, and specific services. The CSN 711 also provides per user policy management of QoS and security, as well as IP address management, support for roaming between different network service providers (NSPs), location management among ASNs.

FIG. 7B shows a reference architecture that defines interfaces (i.e., reference points) between functional entities capable of supporting various embodiments of the invention. The WiMAX network reference model defines reference points: R1, R2, R3, R4, R5, R6, and R8. R1 is defined between the MS 71 and the ASN 703a; this interface, in addition to the air interface, includes protocols in the management plane. R2 is provided between the MS 71 and an CSN (e.g., CSN 711a and 711b) for authentication, service authorization, IP configuration, and mobility management. The ASN 703a and CSN 711a communicate over R3, which supports policy enforcement and mobility management.

R4 is defined between ASNs 703a and 703b to support inter-ASN mobility. R5 is defined to support roaming across multiple NSPs (e.g., visited NSP 729a and home NSP 729b). R6 is defined between base stations 705 and ASN-GWs 709, and R8 is defined between base stations 705.

Figure 8:
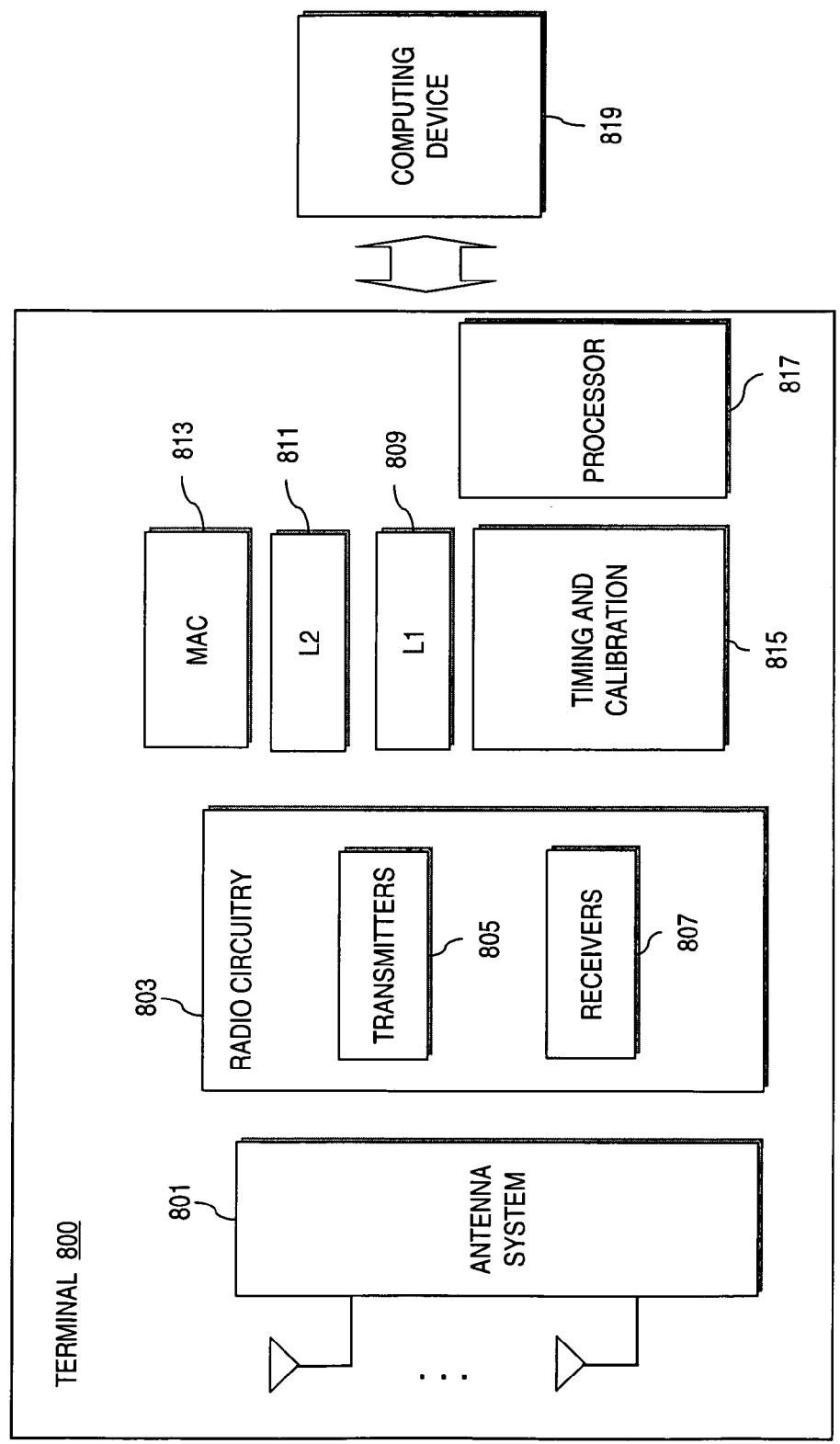
FIG. 8 is a diagram of exemplary components of a user terminal configured to operate in the systems of FIGS. 7A and 7B, according to an embodiment of the invention.

FIG. 8 is a diagram of exemplary components of a user terminal configured to operate in the systems of FIGS. 7A and 7B, according to an embodiment of the invention. A user terminal 800 includes an antenna system 801 (which can utilize multiple antennas) to receive and transmit signals. The antenna system 801 is coupled to radio circuitry 803, which includes multiple transmitters 805 and receivers 807. The radio circuitry encompasses all of the Radio Frequency (RF) circuitry as well as base-band processing circuitry. As shown, layer-1 (L1) and layer-2 (L2) processing are provided by units 809 and 811, respectively. Optionally, layer-3 functions can be provided (not shown). Module 813 executes all Medium Access Control (MAC) layer functions. A timing and calibration module 815 maintains proper timing by interfacing, for example, an external timing reference (not shown). Additionally, a processor 817 is included. Under this scenario, the user terminal 800 communicates with a computing device 819, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  retrieving via one or more processors, information specifying a list of network access providers which may be associated with a home network service provider, wherein the information includes a field having at least one of the following values,
    a first value indicating that the network access providers in the list have a higher priority than other network access providers, wherein the other network access providers are not in the list,
    a second value indicating that the network access providers in the list have equal priority with the other network access providers, or
    a third value indicating that only the network access providers in the list are to be selected; and
  causing, at least in part, via the one or more processors, a selection of a network access provider according to the value of the field.

2. A method according to claim 1, wherein the network access providers in the list or the other network access providers are either directly or indirectly connected to the home network service provider.

3. A method according to claim 1, wherein the information is received from a device management server that resides in a domain of the home network service provider, the information being pre-provisioned at either a point of manufacturing, or a point of sale.

4. A method according to claim 1, wherein the information is configured manually.

5. A method according to claim 1, further comprising:
  communicating with a network corresponding to the selected network access provider.

6. A method according to claim 1, wherein the information includes a contractual agreement preference list (CAPL).

7. A non-transitory computer-readable storage medium carrying one or more sequences of one or more instructions which, when executed by the one or more processors, causes the one or more processors to perform the method of claim 1.

8. An apparatus comprising:
  at least one processor; and
  at least one memory including computer program code,
    the at least one memory and the computer program code configured to, with the at least one processor, cause the apparatus to perform at least the following:
  retrieve information specifying a list of network access providers which may be associated with a home network service provider, wherein the information includes a field having at least one of the following values,
    a first value indicating that the network access providers in the list have a higher priority than other network access providers, wherein the other network access providers are not in the list,
    a second value indicating that the network access providers in the list have equal priority with the other network access providers, or
    a third value indicating that only the network access providers in the list are to be selected; and
  cause, at least in part, a selection of a network access provider according to the value of the field.

9. An apparatus according to claim 8, wherein the network access providers in the list or the other network access providers are either directly or indirectly connected to the home network service provider.

10. An apparatus according to claim 8, wherein the information is received from a device management server that resides in a domain of the home network service provider, the information being pre-provisioned at either a point of manufacturing, or a point of sale.

11. An apparatus according to claim 8, wherein the information is configured manually.

12. An apparatus according to claim 8, wherein the apparatus is further caused to communicate with a network corresponding to the selected network access provider.

13. An apparatus according to claim 8, wherein the information includes a contractual agreement preference list (CAPL).

14. A method comprising:
  retrieving, via one or more processors, information specifying a list of network service providers, wherein the information includes a field having at least one of the following values,
    a first value indicating that the network service providers in the list have a higher priority than other network service providers, wherein the other network service providers are not in the list,
    a second value indicating that the network service providers in the list have equal priority with the other network service providers, or
    a third value indicating that only the network service providers in the list are to be selected; and
  causing, at least in part, via the one or more processors, a selection of a network service provider according to the value of the field.

15. A method according to claim 14, wherein the information is received from a device management server that resides in a domain of the home network service provider, the information being pre-provisioned at either a point of manufacturing, or a point of sale.

16. A method according to claim 14, wherein the information is configured manually.

17. A method according to claim 14, further comprising:
  communicating with a network corresponding to the selected network service provider.

18. A method according to claim 14, wherein the information includes a roaming agreements preference list (RAPL).

19. A non-transitory computer-readable storage medium carrying one or more sequences of one or more instructions which, when executed by one or more processors, causes the one or more processors to perform the method of claim 14.

20. An apparatus comprising:
  at least one processor; and
  at least one memory including computer program code,
    the at least one memory and the computer program code configured to, with the at least one processor, cause the apparatus to perform at least the following:

retrieve information specifying a list of network service providers, wherein the information includes a field having at least one of the following values,
- a first value indicating that the network service providers in the list have a higher priority than other network service providers, wherein the other network service providers are not in the list,
- a second value indicating that the network service providers in the list have equal priority with the other network service providers, or
- a third value indicating that only the network service providers in the list are to be selected; and cause, at least in part, a selection of a network service provider according to the value of the field.

21. An apparatus according to claim 20, wherein the information is received from a device management server resident in a domain of the home network service provider, the information being pre-provisioned at either a point of manufacturing, or a point of sale.

22. An apparatus according to claim 20, wherein the information is configured manually.

23. An apparatus according to claim 20, wherein the apparatus is further caused to communicate with a network corresponding to the selected network service provider.

24. An apparatus according to claim 20, wherein the information includes a roaming agreements preference list (RAPL).

* * * * *